(12) United States Patent
Kishima et al.

(10) Patent No.: US 6,967,050 B2
(45) Date of Patent: Nov. 22, 2005

(54) OPTICAL RECORDING MEDIUM AND A METHOD OF MANUFACTURING THE SAME

(75) Inventors: Koichiro Kishima, Kanagawa (JP); Isao Ichimura, Tokyo (JP); Kimihiro Saito, Saitama (JP); Kiyoshi Osato, Chiba (JP)

(73) Assignee: Sony Corporation, (JP)

( * ) Notice: Subject to any disclaimer, the term of this patent is extended or adjusted under 35 U.S.C. 154(b) by 661 days.

(21) Appl. No.: 09/731,904

(22) Filed: Dec. 8, 2000

(65) Prior Publication Data

US 2002/0004118 A1 Jan. 10, 2002

(30) Foreign Application Priority Data

Jul. 5, 2000 (JP) ............................ P2000-203967

(51) Int. Cl.$^7$ .............................. B32B 3/02; G11B 7/26
(52) U.S. Cl. ................... 428/64.4; 428/64.2; 428/64.9; 369/287; 369/288
(58) Field of Search ............................ 428/64.4, 64.2, 428/64.9; 369/287, 288

(56) References Cited

U.S. PATENT DOCUMENTS

| | | | |
|---|---|---|---|
| 4,650,742 A | * | 3/1987 | Goto et al. ................. 430/271 |
| 5,614,287 A | * | 3/1997 | Sekiya et al. ............... 428/163 |
| 5,635,267 A | * | 6/1997 | Yamada et al. ............ 428/64.4 |
| 5,972,459 A | * | 10/1999 | Kawakubo et al. ........ 428/64.1 |
| 6,166,856 A | * | 12/2000 | Araki et al. ................ 359/627 |
| 6,187,431 B1 | * | 2/2001 | Katsuragawa ............... 428/332 |
| 6,312,780 B1 | * | 11/2001 | Kasami et al. ............. 428/64.1 |

* cited by examiner

*Primary Examiner*—Rena Dye
*Assistant Examiner*—Lawrence D. Ferguson
(74) *Attorney, Agent, or Firm*—Rader, Fishman & Grauer PLLC; Ronald P. Kananen

(57) ABSTRACT

Constructed is an optical recording medium which is so formed as to have excellent surface flatness and with respect to which information is recorded or reproduced with the use of a near-field optical system. The optical recording medium is one which performs at least one of recording and reproduction of information by irradiation of light. The optical recording medium has a substrate 1 which has fine concavities and convexities 2 formed on the surface on a side where irradiation of light is performed, and a formed film layer having at least a recording layer and having a fine concavities and convexities surface reflecting the fine concavities and convexities 2 in itself. The optical recording medium also has a light transmission flattenable film 4 which is so formed on the formed film layer as to have the fine concavities and convexities surface buried therein, and the surface of which is polished and which has a single-layer or a multi-layer structure having a hardness enabling the film to be polished, has a transmission characteristic with respect to the irradiated light to thereby permits transmission of a light irradiated with respect to this optical recording medium.

17 Claims, 7 Drawing Sheets

F I G. 11
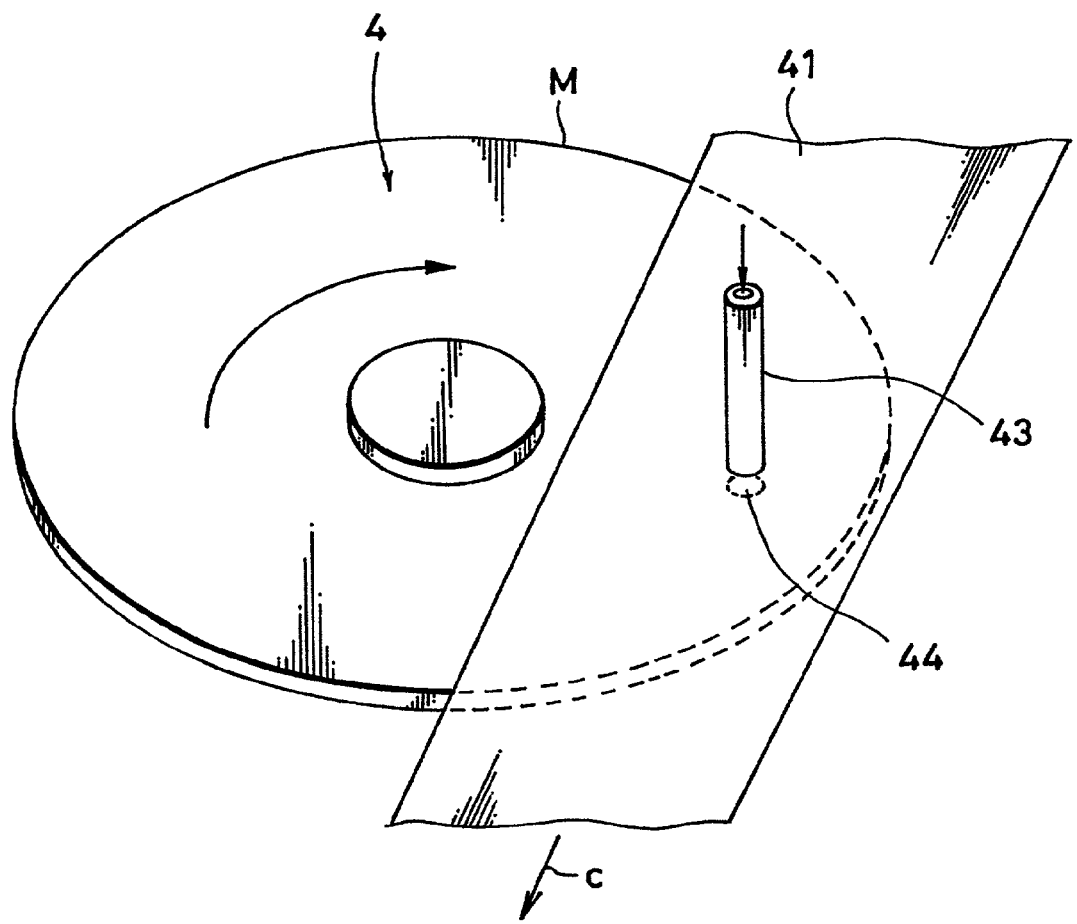

OPTICAL RECORDING MEDIUM AND A METHOD OF MANUFACTURING THE SAME

BACKGROUND OF THE INVENTION

1. Field of the Invention

The present invention relates to an optical recording medium and a manufacturing method of the same. More particularly, the invention concerns an optical recording medium which is used in a state (near-field) where the distance between an optical lens and the optical recording medium is approached to each other up to 200 nm or less, and a manufacturing method of the same.

2. Description of the Related Art

As an optical recording medium, e.g. optical disk there are the so-called ROM type optical disk used for reproduction only, whose substrate has formed therein beforehand, for example, a pit, a groove used for tracking, etc., and the so-called RAM type optical disk such as a phase change type optical disk or optical magnetic disk used for recording and reproduction, whose substrate having formed therein, for example, the pit, the groove used for tracking, etc. has formed thereon a film such as information-recording layer, etc.

In the phase change type optical disk, by irradiation of laser light, its recording layer is phase changed from an amorphous state of low reflectance to a crystalline state of high reflectance or vice versa, whereby recording of information is performed and, by optically detecting the change in the reflectance, reproduction of information is performed.

Also, in the magneto-optic disk, by application of an external magnetic field or irradiation of laser light, the magnetized state of the recording layer is changed and recording of information thereinto is thereby performed. By this magnetization, the angle of polarization of the reproduction laser light is rotated due to the magneto-optic effect, e.g. Kerr effect resulting from the state of magnetization. By detecting this rotation, reproduction of the information is performed.

Each of those optical disks has a substrate capable of transmitting light therethrough and, on this substrate, has formed-film layers such as a recording layer, a reflection layer, a dielectric protection layer, etc. By a laser light being incident upon the optical disk from the side of the substrate, recording and reproduction are performed with respect to the recording layer.

The recording density of the optical disk generally depends upon the diameter of the laser spot of the light source. The smaller the diameter of the laser spot is, the higher the recording density can be made. The diameter of the laser spot is proportionate to $1\lambda/NA$ ($\lambda$: the wavelength of the laser light and NA: the numerical aperture of the objective lens). Accordingly, in order to increase the recording density of the optical recording medium, it is demanded to make the wavelength of the laser light shorter and make the value of the NA greater.

As the method of realizing the increase in the value of NA, there has in recent years been proposed from Telaster Company a near-field optical disk in which the distance between the optical disk and the optical lens is 200 nm or less. Also, from Quinta Company, there has been proposed an optical hard disk wherein an optical lens is loaded on a slider and the distance between the optical disk and the slider thereby becomes 100 nm or less, etc. In the optical system performing recording or reproduction of each of these optical disks there is contained a solid immersion lens (SIL), and thereby it is possible to obtain a value of NA>1.

By the way, in case the optical system has had its NA increased, there occurs the problem that the coma-aberation becomes large. The coma-aberation is proportionate to (skew angle)$\times$(NA)$^3\times$(the distance over which laser light transmits through the optical disk) (provided, however, that the skew angle is an angle of inclination defined with respect to the optical axis of the optical disk). As stated above, because laser light is irradiated onto the recording layer from the side of the substrate, in order to decrease the coma-aberation, it is necessary to make the substrate thin. In view of the fact that a plastic injection molded substrate has hitherto been widely used as the substrate of the optical disk, thinning the substrate with a high precision is difficult in terms of the manufacture.

In contrast to this, there is a recording/reproducing method wherein irradiation of laser light at the time of the recording or reproduction is performed from the side having formed thereon the recording layer of the optical disk so as to largely reduce the distance over which laser light transmits through the optical disk. The use of this method enables decreasing the coma-aberation, and therefore this method becomes suitable for the increase in the value of NA.

As the optical disk there is also an optical disk which, for example, has formed therein grooves for tracking, with an information recording layer being formed in a groove or information recording layer formed on the so-called "land" between adjacent grooves, wherein information is recorded thereon. Further, as the optical disk there is also a land/groove recording type optical disk wherein recording is performed in both each of the grooves and each of the lands. In case recording is performed using this system of land/groove recording, it is possible to increase the recording density.

In the near-field optical disk apparatus wherein as stated above the optical disk and the optical system such as an optical lens are disposed near to each other up to a distance of approximately 200 nm or less, in case there exists a defect which is shaped like a convexity (hereinafter referred to as "a projection") on the surface of the optical disk, this causes damage to the optical system. Accordingly, the optical disk which is used as a near-field one is needed to have its surface flattened with a high precision. Especially, it is strictly demanded to have no projection on its surface.

Also, in the optical disk made with a method wherein laser light is irradiated from the side having the recording layer, there is a disk of a type having a protection layer whose thickness is approximately 100 $\mu$m or so formed on the surface of its recording-layer side. This protection layer is formed using a method of bonding together spin-coats or films of, for example, ultraviolet-ray hardenable resin.

However, in case forming the protection layer made of the ultraviolet-ray hardenable resin, at the time of forming the spin-coat, etc. there occurs therein a swell due to inclusion therein of air bubbles or particles due to the air being entrapped. This swell has no method to eliminate under the existing circumstances. Therefore, the swell becomes a projection on the surface of the optical disk. In other words, the ordinary organic material layer which is made of ultraviolet-ray hardenable resin or the like has high flexibility and therefore after forming the film it is impossible to perform polishing such as, for example, FTP (Flying Tape Polish).

Accordingly, the optical disk having the above-described protection film on its surface is inadequate as the optical disk which is applied to a recording/reproduction apparatus using the near-field optical system wherein the optical disk and the optical system are disposed near to each other up to the distance of approximately 200 nm or less.

However, in case avoiding the formation of the protection layer in order to eliminate such an inconvenience, the recording layer having a concavity and convexity surface on the substrate which has a fine concavity and convexity surface due to the above-described pits, grooves, etc., the recording layer being one having formed thereon the concavity and convexity surface in such a way as for it to follow the configuration of which fine concavity and convexity surface, i.e. in such a way as to reflect this surface, does not have its surface concavities and convexities mitigated by the protection layer. Therefore, especially, in case the resulting optical disk is used together with the near-field optical system wherein the distance thereof from the optical system is approximately 200 nm or less, the distance between the land portion and the groove portion becomes great. This causes the occurrence of the inconvenience that the characteristic decreases, the recording density cannot sufficiently be increased, etc.

Also, by forming a material layer having an appropriate index of refraction on the surface of the optical disk, it is possible to decrease the surface reflection from a prescribed layer or to control multiplex interference with a prescribed layer. Therefore, it is possible to improve the MTF (Modulation Transfer Function). However, in case avoiding the formation of a surface layer such as the protection layer on the surface of the optical disk, the improvement of the MTF cannot be expected.

As stated above, in order to make up the optical disk into a structure of land/groove for increasing the recording density of the optical disk and also to improve the MTF, it is necessary to form a light transmission layer such as a protection layer capable of satisfying prescribed optical conditions on the surface on the laser light irradiation side of the optical disk, i.e. the recording layer side thereof. In this case, the surface should be flattened with a high precision.

In case of forming such a protection layer on the surface of the optical disk in a state of vacuum by the use of a method such as sputtering, the protection layer is also formed within the groove as well with a thickness substantially equal to that of the protection layer on the land. Resultantly, the surface of the protection layer has a configuration that reflects the difference in level of the backing layer. Accordingly, it is necessary to polish the entire surface and flattening the same requires the use of a significantly large length of time. Also, it is also considered as being available to adopt a method wherein the entire surface is polished after depositing a layer of an excessively large thickness, e.g. a protection layer having a thickness of 1 to 2 $\mu$m so that the difference in level of the surface may be dissolved. In this case as well, a large length of time is needed. In either case, it is necessary to control the polishing with a high precision so as to make the thickness of the layer uniform.

If forming the protection layer using ultraviolet-ray hardenable resin as the material and by the use of, for example, a spin-coating method, the flat surface is obtained. However, because there is the problem of projections due to inclusion of the air bubbles, etc. and further these projections cannot be abated by polishing as stated above, the decrease in the yield follows.

Further, the formation of the respective layers such as reflection layer, recording layer, dielectric layer, etc. onto the substrate of the optical recording medium is generally performed in an atmosphere of vacuum by sputtering respective materials therefor. In this case, when performing the layer formation, there is a case where due to the surface condition of the sputter surface, the configuration of it, and other reasons abnormal electric discharge occurs during the sputtering. Resultantly, thorn-like projections occur from the surface of the formed layer. And, once these thorn-like projections have occurred, the thereafter-succeeding layer formation performed by sputtering is impossible to flatten the projections. In addition, there is also a case where the height of the thorn-like projections rises even to around the thickness of the formed layer.

And, when those projections have been formed, even if depositing, for example, the protection layer on the layer having the projections thereon, selecting the thickness of that protection layer to have a value which is sufficiently larger than that corresponding to the height of the projection is necessary for obtaining a sufficient flatness on the surface of the protection layer.

SUMMARY OF THE INVENTION

The object of the present invention is to provide an optical recording medium which is able to solve the above-described problems and a manufacturing method therefor.

To attain the above object, the invention provides an optical recording medium which is an optical recording medium which performs at least one of recording and reproduction of information by irradiation of light, and which has a construction wherein there is provided a substrate having fine concavities and convexities formed on the surface thereof on a side wherein the irradiation of light is performed. There is formed on the substrate a formed film layer the surface of which is made a fine concavities and convexities surface reflecting the fine concavities and convexities on itself and which has at least a recording layer.

And, in the present invention, there is made up a construction wherein there is formed a light transmission flattenable film which has buried therein the fine concavities and convexities surface, and which has a transmission characteristic with respect to the irradiated light, and that has its surface polished and has a hardness enabling it to be polished.

The light transmission flattenable film is constructed using inorganic material film.

Also, the light transmission flattenable film is constructed using inorganic material film the formation temperature of which is 150° C. or less.

Also, a manufacturing method of an optical recording medium is one in which at least one of recording and reproduction of information is performed by irradiation of light, and includes the following steps. A manufacturing step of manufacturing a substrate having fine concavities and convexities formed on the surface thereof on a side from which the irradiation of light is performed; a forming step of forming a formed film layer the surface of which is made a fine concavities and convexities surface reflecting the fine concavities and convexities in itself and which has at least a recording layer; a forming step of forming a light transmission flattenable film which is formed on the formed film layer and which has buried therein the fine concavities and convexities surface, and which has a transmission characteristic with respect to the irradiated light, and which has a hardness enabling it to be polished; and a polishing step of polishing at least the surface of the light transmission flattenable film.

Further, in this manufacturing method, before forming the light transmission flattenable film there can be adopted a step of eliminating or truncating the protrusion which has occurred on the surface of the formed film layer of the light transmission flattenable film.

As described above, in the optical recording medium of the invention, there has been made up a construction wherein there is formed, especially, the light transmission flattenable film the surface of which is polished. Resultantly, when performing at least one of recording and reproduction using the above-described near-field optical system, even in case the interval between the optical recording medium and the optical system is made to be approximately 200 nm or less, for example 100 nm or so, recording or reproduction can be reliably performed. In addition, even in the mode of land/groove recording, recording or reproduction can be reliably performed.

And, by constructing the light transmission flattenable film using a prescribed inorganic material the formation temperature of which is 150° C. or less, the substrate constituting the optical recording medium can be constructed using an organic material substrate which in general has low heat-resistance but is inexpensive and highly mass producible.

Also, the manufacturing method of the invention, in order to manufacture the optical recording medium, adopts the step of forming the polishable light transmission flattenable film on the formed film layer including the recording layer, which has the fine concavities and convexities and of polishing the surface of that film. The manufacturing method can thereby construct the optical recording medium the surface of which has excellent flatness. Further, the manufacturing method, as described above, adopts, before forming the light transmission flattenable film, the step of eliminating or truncating the protrusion which has occurred on the surface of the formed film layer of the light transmission flattenable film. The manufacturing method thereby enables reliably obtaining an excellent level of flatness of the surface, and a sufficiently small thickness, of the light transmission flattenable film.

Namely, as is apparent from the description that follows, in case performing no operation of eliminating or truncating the protrusion on the surface on which the light transmission flattenable film is formed, the following inconvenience occurs. Namely, in this case, even when having polished the surface of the light transmission flattenable film after forming the light transmission flattenable film, it is difficult to make the gride height of that surface 50 nm or less. In contrast to this, when performing the above-described elimination or truncate processing of the protrusion, that gride height could be easily made 30 nm or less.

BRIEF DESCRIPTION OF THE DRAWINGS

FIG. 11 is a perspective view of an example of the polishing apparatus according to the present invention.

DETAILED DESCRIPTION OF THE PREFERRED EMBODIMENTS

An embodiment of an optical recording medium and a manufacturing method of the same according to the present invention will now be explained.

[Optical Recording Medium]

An optical recording medium according to the invention can be made up into various kinds of constructions which include respective ones of a phase change type optical recording medium, an optical recording medium utilizing the magneto-optic effect, and a pigment recording medium having a pigment recording layer.

Also, the optical recording medium according to the invention can take various physical forms such as a disk, a card, or a sheet.

Figure 1:
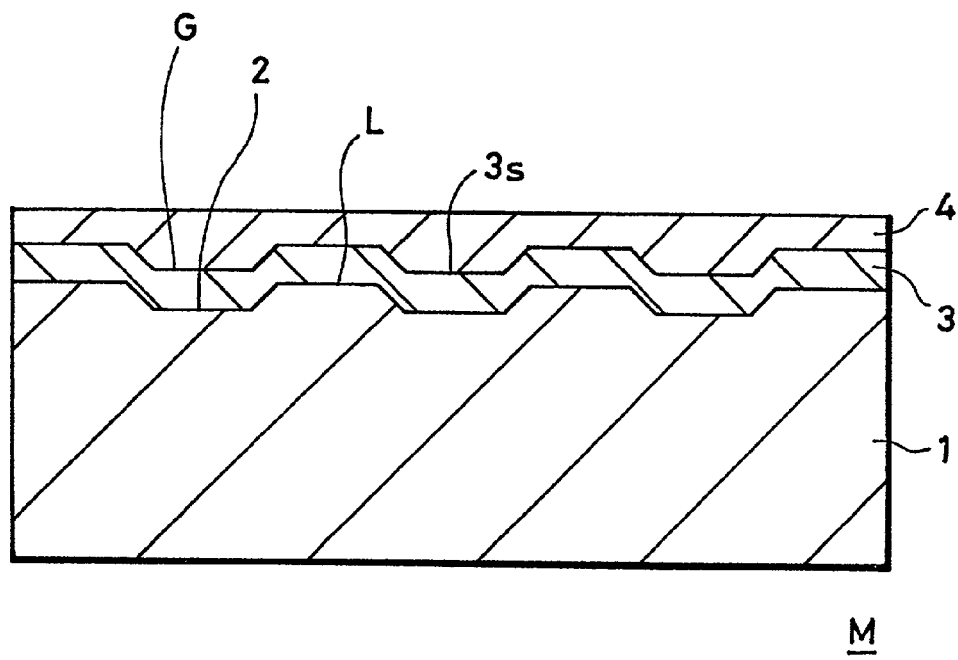
FIG. 1 is a schematic sectional view of a fundamental construction of an optical recording medium according to the present invention.

FIG. 1 is a schematic sectional view of the fundamental construction of the optical recording medium M according to the invention.

The optical recording medium M according to the invention is one which performs at least one of recording and reproduction of information by radiating light. The medium M has a substrate 1 which has formed with respect to the surface thereof fine concavities and convexities 2 which include, and are comprised of, various kinds of information pits, and discontinuous or continuous grooves G, lands L, etc. used for tracking.

And, on the surface having formed thereon the fine concavities and convexities 2 of this substrate 1 there is formed a formed film layer 3 having at least a recording layer, which includes, for example, a reflection film, a recording layer of information, and a dielectric layer. On the surface of the formed film layer 3 there are formed fine concavities and convexities 3s having reflected thereon a fine concavities and convexities surface due to the existence of the fine concavities and convexities 2.

And, in such a way as to have buried therein the fine concavities and convexities 3s, a light transmission flattenable film 4, which is capable of being polished is formed. The surface of this film 4 is then polished and flattened.

The groove G is formed into, for example, a spiral configuration and the land L is formed between adjacent ones of the grooves G. In the present invention, two recording modes of information can be adopted, one being a recording mode wherein information is recorded into either the land L or the groove G, the other being a land/groove recording medium mode wherein information is recorded into each of the land L and groove G. In this case, the difference in level between the land L and the groove G is selected to have a value which causes no mutual interaction between lights with respect to the recording and reproducing light which is irradiated on the optical recording medium.

The substrate 1 can be a resin substrate which is made of heat-resisting resin such as, for example, polyether sulfone (PES) or polyether imde (PEI), or can be a glass substrate, each substrate having a thickness of, for example, 0.3 to 1.2 nm or so.

The reflection film of the formed film layer 3 can be constructed as a reflection film which reflects a recording or reproducing light which has entered into the optical recording medium and transmitted through the recording layer. For example, the reflection film consists of, for example, an Al film or Al alloy film having a film thickness of, for example, from 50 to 200 nm or so, e.g. 100 nm. In this case, this reflection film is made to have not only the function of the above-described reflection film but also the function of causing suitable diffusion of heat from the recording layer. To this end, this reflection film can be constructed using metal constituting material having a required refraction index and heat conductivity, or using other metalloid, compound of metal or metalloid, semiconductor, or its compound other than metal.

And, for example, in case the optical recording medium is a phase change type optical recording medium, the recording layer, dielectric layer, etc. of the formed film layer 3 can be constructed as follows. Namely, the formed film layer 3 can include a recording layer such as a GeSbTe layer wherein a recording layer whose phase is changeable presents an amorphous state exhibiting, for example, a low reflectance, and a crystalline state exhibiting a high reflectance, with respect to reproducing light. The state of that phase-changeable recording layer can be reversibly changed through irradiation of recording light. Said recording layer, dielectric layer, etc. can be constructed to have formed over and under such recording layer a protection layer, consisting of a light transmission dielectric layer made of, for example, ZnS—SiO$_2$ having the function of permitting the deformation of the recording layer.

The phase change recording layer can be constructed using material whose phase is reversibly changeable from crystalline to amorphous state or vice versa by irradiation of laser, such as, for example, chalcogens compounds which include, for example, in addition to the GeSbTe, Te, Se, GeTe, InSbTe, InSeTeAg, InSe, InSeTlCo, InSbSe, Bi$_2$Te$_3$, BiSe, Sb$_2$Se$_3$, and Sb$_2$Te$_3$.

Also, for example, in case the optical recording medium is a magneto-optic recording medium, the formed film layer 3 can be constructed to have a reflection layer, and to have sequentially formed on the reflection layer a dielectric layer made of, for example, SiN, a recording layer comprised of a first magnetic layer made of, for example, a GdFeCo layer and a second magnetic layer made of, for example TbFeCo layer, and a light transmission dielectric layer which is formed on the resulting layers and which is comprised of, for example a SiO$_2$ and SiN layer.

And, the light transmission flattenable film 4 which is formed on the formed film layer 3 in such a way as to have buried therein the fine concavities and convexities thereof is constructed as follows. Namely, the flattenable film 4 consists of a single layer or multi-layer film which consists of a layer having a light transmission characteristic with respect to light irradiated onto the optical recording medium M and a hardness enabling the layer to be polished. The flattenable film 4 has its surface polished and thereby flattened. Namely, the flattenable film 4 has its projections abated to have a flatness, the projections causing damage to an optical system disposed close, and in opposition, to this optical recording medium to thereby perform irradiation of light with respect to the optical recording medium M.

It is preferable that the light transmission flattenable film 4 be constructed of spin-coated material. The reason for this is as follows. In case the film 4 is constructed using spin-coating, when forming the film 4, this film 4 has buried therein with excellent coverage the concavities and convexities of the surface having formed thereon the film 4. It is thereby possible to form the light transmission flattenable film 4 having excellent flatness.

Also, the thickness of the light transmission flattenable film is made to be 400 nm or less, for example, 200 to 300 nm. Namely, for example, that thickness is made to be 200 nm on the land L and 300 nm in the groove G.

And, the light transmission flattenable film 4 can be constructed of an inorganic material film, or further a material consisting mainly of SiO$_2$, such as, for example, SOG (Spin on Glass).

Also, the light transmission flattenable film 4 can be constructed using a light transmission flattenable material film the formation temperature of which is 150° C. or less, for example, a low-temperature hard coat material of NHC LT-101 (0421) (manufactured by Nissan Chemical Industry Co. Ltd).

In this way, by constructing the light transmission flattenable film 4 by the use of the light transmission flattenable material layer the formation temperature of which is 150° C. or less, the substrate 1 constituting the optical recording medium can be constructed using the following substrate. Namely, the above-stated organic material substrate which although generally having low heat resistance is inexpensive and has excellent mass-production characteristic, namely the substrate such as a resin substrate made of resin and having heat resistance such as polyether sulfon (PES) or polyether imide (PEI).

Incidentally, the light transmission flattenable film 4 can be made up into a multi-layer structure wherein the layers are repeatedly formed twice or more.

Also, on the surface on which the light transmission flattenable film 4 is formed, i.e., between the formed film layer 3 and the light transmission flattenable film 4, a dielectric backing layer can be disposed.

The dielectric backing layer can be constructed as a light interference film which decreases the reflection of the irradiation light from the recording layer, or can be constructed as a material layer having the function of increasing the surface hardness of the optical recording medium.

As the material of the dielectric backing layer of the light transmission flattenable film 4, it is possible to use oxide such as SiO$_2$, SiN, MgO, AlO, or TaO, nitride such as TiN, BN, or AlN, halide such as MgF, or NaAlF, sulfide such as ZnS, or mixed crystal of these materials. Also, it is also possible to use nitride oxide such as AlON for example.

In this way, by forming the dielectric-material backing layer, the surface hardness of the optical disk can be enhanced and the MTF can also be improved.

However, the dielectric backing layer of the light transmission flattenable film 4 is not requisite. Namely, in case that the dielectric layer of the formed film layer 3 has the function demanded of the dielectric backing layer, the dielectric backing layer can needless to say be omitted.

Next, an optical recording medium according to the invention will be explained but the invention is not limited to this example.

[Example of Phase Change Optical Recording Medium]

First, an example of the optical recording medium M which is a phase change optical recording medium will be explained. In this case, as illustrated in a schematic sectional view of FIG. 2, there is a substrate 1 which has formed thereon fine concavities and convexities comprised of a groove G having a depth of, for example, 30 nm and a land formed between the grooves. On this substrate 1 there are sequentially formed by, for example, sputtering the following films. Namely, a reflection film 3a which is made of an Al alloy film having a thickness of, for example, 100 nm, a first dielectric film 3b which is made of a material of $ZnS:SiO_2$ and which has a thickness of, for example, 20 nm, a phase change recording layer 3c which serves as the recording layer and which is made of a material of GeSbTe having a thickness of, for example, 12 nm, and a second dielectric film 3d which is made of a material of $ZnS:SiO_2$ having a thickness of, for example, 80 nm.

And, on this formed film layer 3, there is formed a light transmission flattenable film 4. However, in this example, on the formed film layer 3 there are formed via a backing layer 4a made of a material of SiN having a thickness of, for example, 25 nm the light transmission flatternable film 4 having a thickness of 60 nm and, on this film 4, a surface layer 4b made of a material of SiN having a thickness of, for example, 25 nm.

In this case, the light transmission film 4 has its surface polished by, for example, the FTP technique. Further, the surface layer 4b formed on the light transmission flattenable film 4 also has its surface polished by, for example, the FTP technique.

[Example of Magneto-optic Recording Medium]

Figure 3:
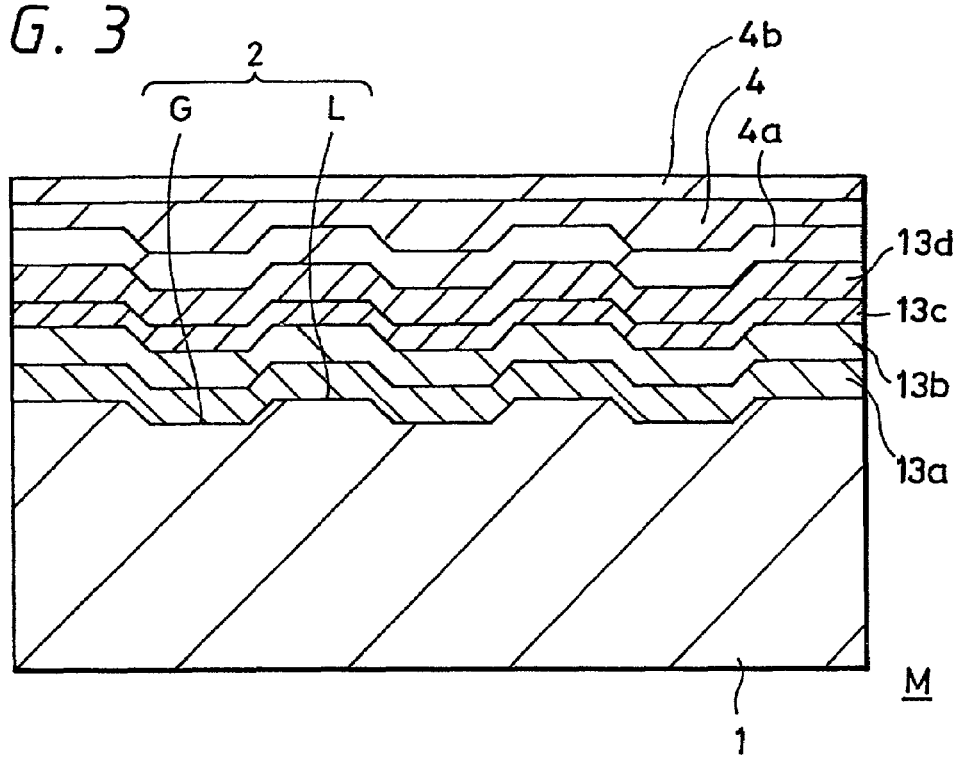
FIG. 3 is a schematic sectional view of another example of the optical recording medium according to the present invention.

Also, for example, in case the optical recording medium is a magneto-optic recording medium, as illustrated in a schematic sectional view of FIG. 3, similarly, there is a substrate 1 which has formed thereon fine concavities and convexities 2 comprised of a groove G having a depth of, for example, 30 nm and a land formed between the grooves. On this substrate 1 there are sequentially formed by, for example, sputtering the following films. Namely, a reflection film 13a which is made of an Al alloy film having a thickness of, for example, 100 nm, a dielectric film 13b which is made of a material of SiN and which has a thickness of, for example, 20 nm, a first magnetic film 13c which constitutes the recording layer and which is made of a material of GaFeCo having a thickness of, for example, 3 nm, and a second magnetic film 3d which is made of a material of TeFeCo having a thickness of, for example, 15 nm.

And, on this formed film layer 3, there are formed via a backing layer 4a made of a material of SiN having a thickness of, for example, 25 nm the light transmission flatternable film 4 having a thickness of 60 nm and, on this film 4, a surface layer 4b made of a material of SiN having a thickness of, for example, 25 nm.

In this case, also, the light transmission film 4 has its surface polished by, for example, the FTP technique. Further, the surface layer 4b formed on the light transmission flattenable film 4 also has its surface polished by, for example, the FTP technique.

[Recording and Reproduction Apparatus with Respect to Optical Recording Medium According to the Invention]

Next, a recording and reproduction apparatus which the optical recording medium according to the invention is applied and which performs near-field or/and reproduction with respect thereto, especially a head portion thereof, will be explained.

Figure 4:
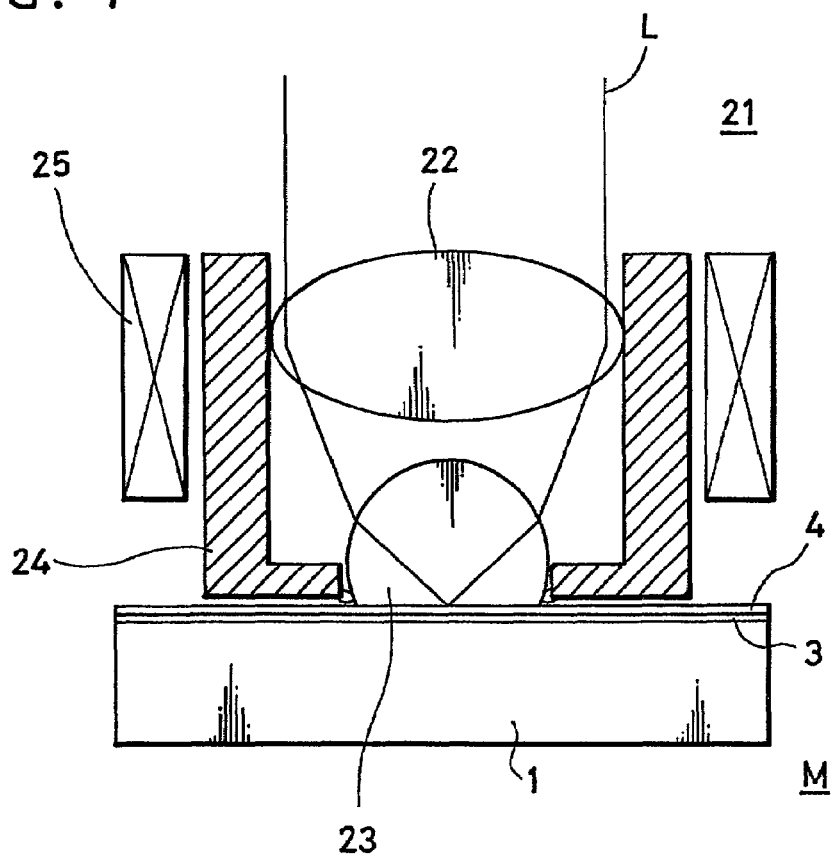
FIG. 4 is a sectional view of an example of a head portion of a recording/reproduction apparatus which is applied to the optical recording medium according to the present invention.

FIG. 4 is a schematic sectional view of an example of the head portion 21 of that apparatus. A laser beam L is converged by an objective lens 22 to thereby enter into a solid immersion lens (SIL) 23. A group of lenses comprised of the objective lens 22 and the SIL 23 is held by a lens holder 24. The lens holder 24 is movable in both the optical-axis direction and the within-disk-plane direction by the operation of an electromagnetic actuator 25, thereby the grouped lenses are position adjusted. Also, because the objective lens 22 and the SIL 23 are held by the same lens holder 24, the distance between the objective lens 22 and the SIL 23 is kept constant.

The SIL 23 has a configuration prepared by the spherical lens being partly cut away, and is disposed in such a way that the spherical surface is opposed to the objective lens 22 and the bottom surface constituted by a flat surface is opposed to the optical recording medium M. The SIL 23 is designed so that a laser beam may be subjected to stigmatic focusing.

This head portion 21 is located being approached to the light transmission flattenable film 4 side of the optical recording medium M according to the invention up to 200 nm or less and opposed in this state thereto, thereby recording or/and reproduction are performed.

Figure 5:
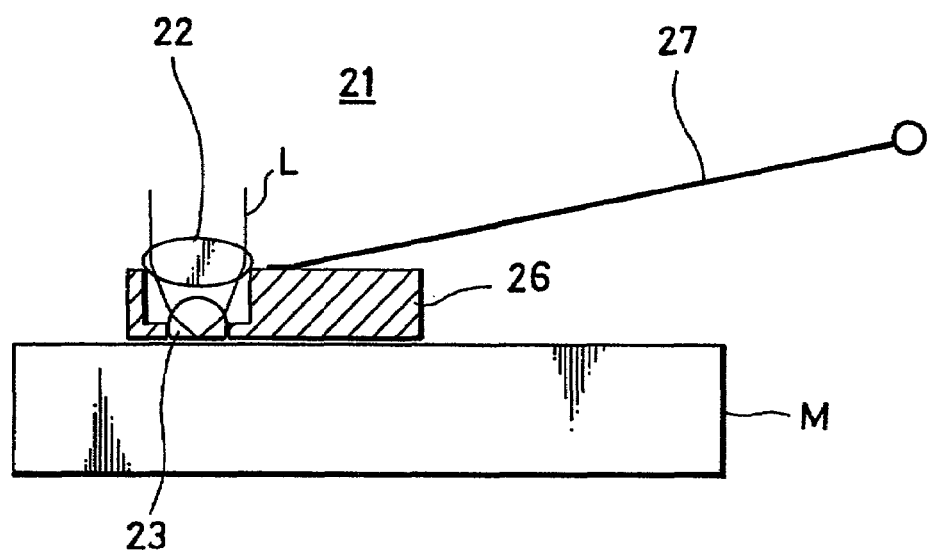
FIG. 5 is a sectional view of another example of the head portion of the recording/reproduction apparatus which is applied to the optical recording medium according to the present invention.

Also, FIG. 5, similarly, is a schematic sectional view of an example of the head portion 21 of another near-field recording or/and reproduction apparatus which the optical recording medium M according to the invention is applied to. In this example as well, the laser beam L is converged by the objective lens 22 and enters into the solid immersion lens (SIL) 23.

As stated above, a group of lenses comprised of the objective lens 22 and SIL 23 is held by the lens holder 24 (not illustrated). It is made movable in both the optical-axis direction and the within-plane-direction of the optical recording medium by the operation of an electromagnetic actuator 25 (not illustrated). And it is held by a slider 26. The slider 26 is set so that a required pressing force may elastically act toward the optical recording medium M through the operation of an arm 27. And the slider 26 is made floatable from the optical recording medium M so as to approach and oppose the medium M through the action of an air bearing constituted by a current of air which occurs due to the rotation of the optical recording medium M, for example an optical disk.

And, in this case as well, the head portion 21 is located being approached to the light transmission flattenable film 4 side of the optical recording medium M according to the invention and opposed in this state thereto, thereby recording or/and reproduction are performed.

[Manufacturing Method of Optical Recording Medium]

Next, a manufacturing method of an optical recording medium according to the invention will be explained.

The manufacturing method according to the invention has a step of manufacturing a substrate 1 the surface of which has formed thereon the fine concavities and convexities 2.

The substrate 1 having these fine concavities and convexities 2 is formed by injection molding of, for example, polyether sulfone (PEC).

Or the fine concavities and convexities 2 are formed of, for example, ultraviolet-ray hardenable resin, etc. being coated on the substrate and by a two-P technique (Photopolymerization).

Figure 6A:
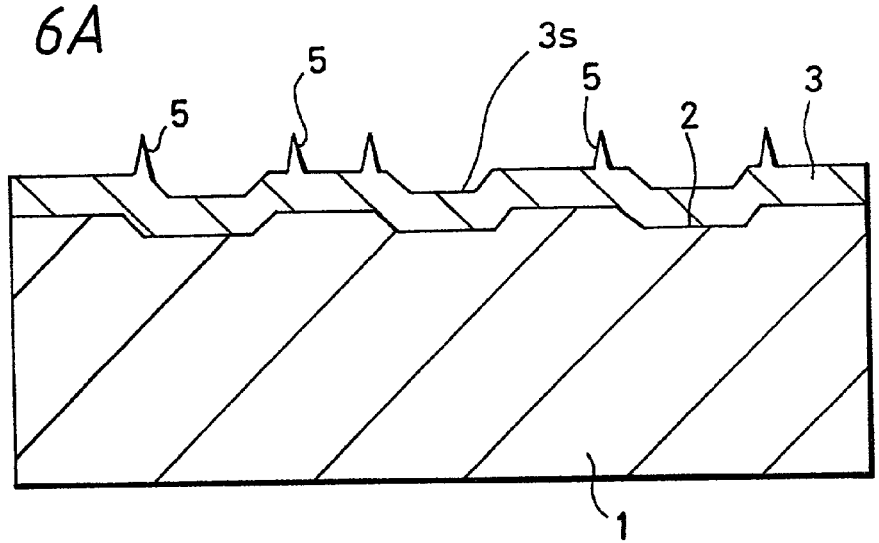
FIGS. 6A to 6C are explanatory views of polishing performed before forming a light transmission flattened film.

As illustrated in FIG. 6A, on the substrate 1 there is formed, for example, by sputtering the formed film layer 3 which has at least a recording layer and in which fine concavities and convexties 3s reflecting the fine concavites and convexties 2 occur on the surface of the formed film layer 3. FIG. 6A illustrates a state where thorn-like projections 5 have occurred due to an abnormal electric discharge for example.

Figure 6B:
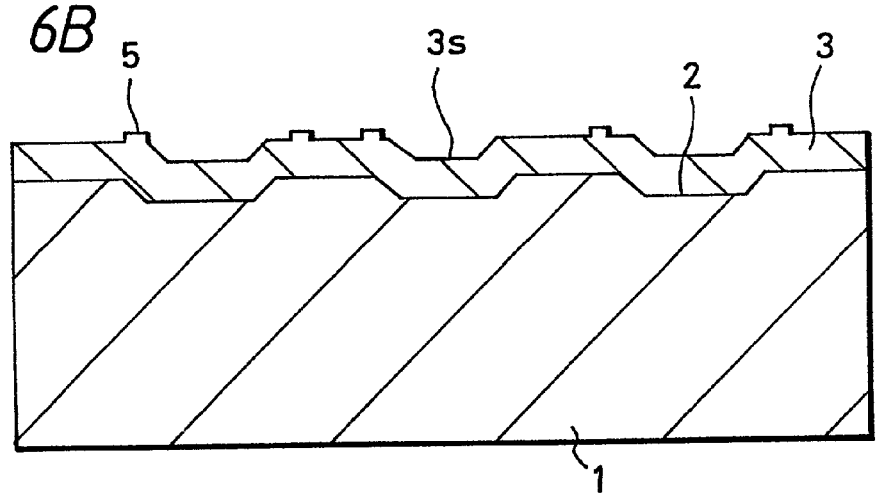

Thereafter, preferably, as have its schematic sectional surface illustrated in FIG. 6A, the projections 5 which are shaped like thorns for example and which have occurred when forming the formed film layer 3 are polished as a polishing step in which to abate or truncate the projections 5 as illustrated in FIG. 6B.

Figure 6C:
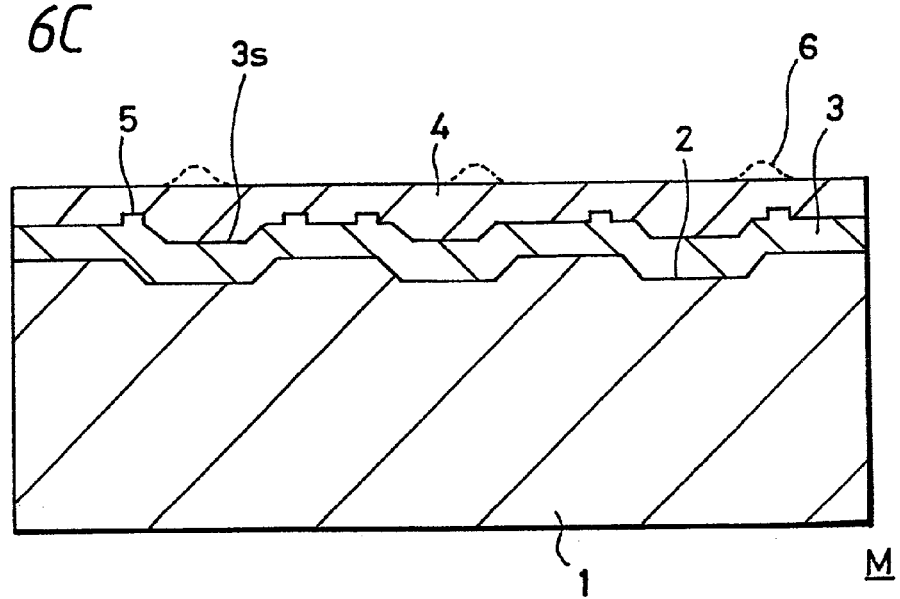

Thereafter, as illustrated in FIG. 6C, on the formed film layer 3 there is formed a single-layer or multi-layer light transmission flattenable film 4 having a transmission characteristic with respect to recording or reproducing irradiation light applied to the optical recording medium M, in such a way that the fine concavities and convexities surface 3s is buried under the film 4. In this case, as illustrated in FIG. 6C, the high thorn-like projections 5 are polished and so the light transmission flattenable film 4 is excellently flattened.

And, further, the surface of the light transmission flattenable film 4 is polished. Thereby, the protrusions 6 which are illustrated in broken lines in FIG. 6C and when forming the light transmission flattenable film 4 have been formed by the air being entrapped, the particles being adhered, etc. are eliminated by polishing.

The formation of the light transmission flattenable film 4 is performed by executing a step of coating an SOG for example made mainly of an inorganic material of, for example, $SiO_2$ by spin coating, and by executing a step of hardening this inorganic material by heating.

Or by performing spin-coating of a light transmission flattenable material film the formation temperature of which is 150° C. or less, for example, a low-temperature hard coat material of NHC LT-101 (0421) (manufactured by Nissan Chemical Industry Co. Ltd), coating thereof is performed to form the light transmission flattenable film 4.

Figure 2:
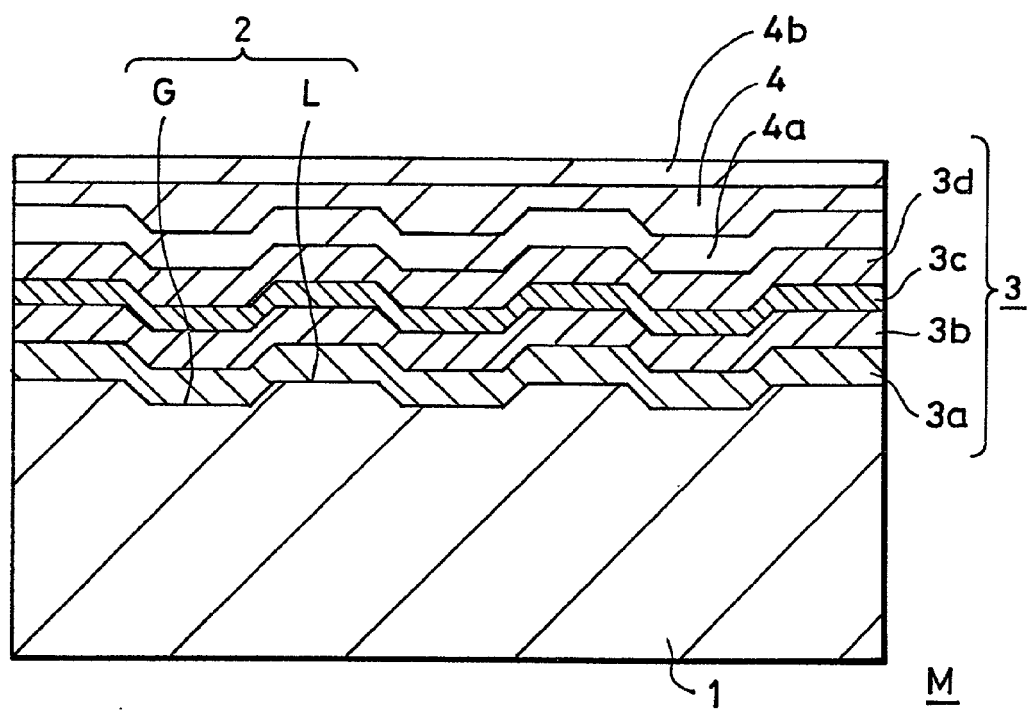
FIG. 2 is a schematic sectional view of an example of the optical recording medium according to the present invention.

When forming the light transmission flattenable film 4, although not illustrated, as a necessity arises, on the formed film layer 3, there can be formed a backing layer 4a from the use of which there is obtained the effect explained in connection with, for example, FIG. 2 or 3 of decreasing, for example, the reflection of the illumination light, i.e. recording or reproducing light, applied to the optical recording medium or of increasing the hardness of the surface.

Incidentally, the polish processing of abating or truncating the projection 5 with respect to the formation surface of the light transmission flattenable film 4, which was explained above in connection with FIG. 6B, can in some cases be omitted according to the relationship of the thickness of the light transmission flattenable film 4 to the thickness of the formed film layer 3, i.e. depending of the height of the projection 5 occurring. However, in case burying the formed film layer 3 with the light transmission flattenable film 4 is insufficient because of a limitation upon the thickness, etc. of the light transmission flattenable film 4, large sizes of projections occur on the light transmission flattenable film 4. Even if in this condition polishing the projections with the use of, for example, the flying tape polish (FTP) technique, that polishing tape is only pressed against the tip ends of the projections. Thereby, as illustrated in a schematic sectional view in FIG. 7, there is a case where the protrusion 6 has its configuration made only dull and is not sufficiently eliminated even by surface polishing and remains as is.

In contrast to this, when as has been explained in connection with FIG. 6 performing abate or truncate processing of the projections 5 beforehand, the above-described inconvenience is avoided. Thereby, making the grand height 100 nm or less, for example, approximately 30 nm or so has been realized.

Next, an embodiment of the optical recording medium M and the manufacturing method of the same according to the invention will be explained in further detail. However, the invention is not limited to that embodiment.

[First Embodiment]

In this embodiment, the optical recording medium M is one the phase change type optical disk of which performs recording or reproduction with respect thereto by using a laser light which wavelength is approximately 650 nm, and the medium M has the structure illustrated in FIG. 3.

Figure 8:
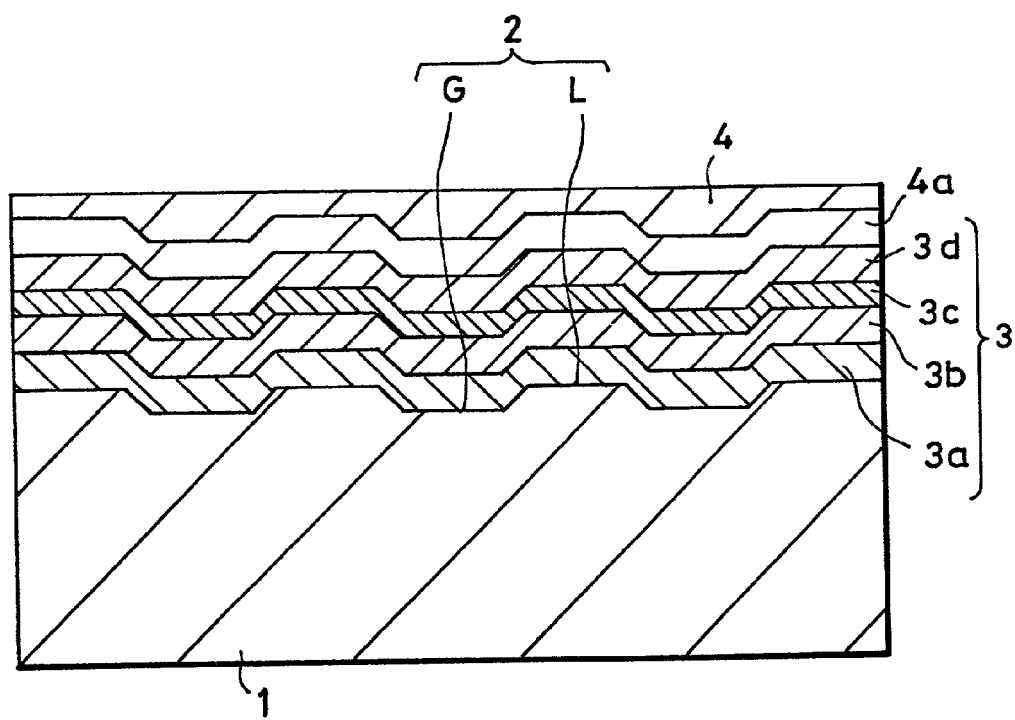
FIG. 8 is a schematic sectional view of an optical recording medium according to an embodiment of the present invention.

With reference to FIG. 8, an explanation will hereafter be given of the optical disk and the manufacturing method of the same according to this embodiment. In this optical recording medium M as well, there is adopted the land/groove recording mode in that information is recorded with respect to both the lands and the grooves.

As stated previously, the substrate 1 is a plastic substrate which has a thickness of, for example, from 0.3 to 1.2 nm or so and which is made of heat-resisting resin such as, for example, polyether sulfone (PES) or polyether imde (PEI), a glass substrate, etc.

On the surface of the substrate 1 there are formed the fine concavities and convexities 2 which have the spiral groove G serving as a guide for tracking and the lands between adjacent ones of the groove G. The difference in level between the land L and the groove G is set to be at a value which is 1/6 of the wavelength of the laser. By this setting, the cross-talk between adjacent tracks, i.e. between the land and the groove adjacent thereto, can be minimized. In this way, it is possible to increase the recording density. The depth of the groove G is set to be, for example, 100 nm relative to the land L.

On the fine concavities and convexities 2 of the substrate 1 there is formed the formed film layer 3 by sputtering. In this formed film layer 3, the reflection film 3a is formed on the surface, having the fine concavities and convexities 2, of the substrate 1. This reflection film 3a has an Al film having a thickness of, for example, 100 nm. The thickness of this reflection film is set to be, for example, from 50 to 200 nm or so as stated previously. As stated previously, the reflection film 3a has not only the function of reflecting light which has entered into the optical disk and transmitted through the recording layer but also the function of causing the promotion of the diffusion of heat from the recording layer. Namely, although the recording layer increases in temperature due to the absorption of a recording or reproducing light, it is possible to make the reflection layer have a heat-sink effect of causing this increased heat to be suitably dissipated due to its action. Namely, the constituent material of the reflection film 3a is constructed using material having a predetermined reflectance and heat conductivity.

And, on the reflection film 3a there are sequentially lamination formed by sputtering a first protection layer 3b which consists of a transparent dielectric layer of $ZnS$—$SiO_2$ having a thickness of, for example, 20 nm, a phase change recording layer 3c of GeSbTe layer having a thickness of, for example, 20 nm, and a second protection layer 3d similarly consisting of a transparent dielectric layer of ZnS—SiO$_2$ having a thickness of 100 nm. Thereby, such by-lamination formed film layer 3 is formed thereon.

And, on the formed film layer 3, there is formed the light transmission flattenable film 4. But, as the backing layer located thereunder, the SiO$_2$ layer having a thickness of, for example, 15 nm and the SiN layer having a thickness of 50 nm for example are similarly sequentially formed by sputtering. These backing layers 4a are so formed as to provide no-reflection conditions with respect to the recording layer 3c in a state including therein the light transmission flattenable film 4, protection layer, etc. formed thereon.

The light transmission flattenable film 4 is constructed of the SiO$_2$ layer having a thickness of, for example, 200 to 300 nm and, if for example the film 4 is set to have a thickness of, for example, 300 nm or so on the groove G and 200 nm on the land, the difference in level on the surface of the substrate 1 is made substantially zero. As a result of this, a flat optical disk surface is obtained.

According to this construction, it is possible to perform land/groove recording and reproduction. Accordingly, it is possible to construct the optical recording medium the recording density of which is high.

Also, in the optical disk of this embodiment, the surface of the light transmission flattenable film 4 is polished and made flat. Therefore, in case the optical disk is used in the near field, the optical disk can be prevented from causing damage to the optical system of the optical disk apparatus.

Next, the manufacturing method of the optical recording medium according to this embodiment will be explained.

At the time of the manufacture, in case constructing the substrate 1 the surface of which has the fine concavities and convexities due to the existence of the groove G by the use of a resin substrate, the substrate 1 is formed, for example, by injection molding. Namely, a stamper which has fine concavities and convexities capable of forming the fine concavities and convexities 3 by transfer is disposed within the cavity of a molding die. Into this cavity, high-speed injection is performed of the resin which has been heated and molten and cooling is performed of the resulting resin to thereby mold the substrate 1.

In case of using the substrate 1 consisting of a glass substrate, the substrate 1 is formed using, for example, 2P method (Photopolymerization Method).

Next, on the surface of the substrate 1 having formed thereon the lands L and groove G, there is formed the reflection film 3a, for example, by sputtering. As this sputtering, it is possible to use, for example, ion beam sputtering.

And, on this reflection film 3a, sputtering is sequentially performed of the above-described first protection layer 3b made of ZnS—SiO$_2$, the above-described recording layer 3c made of GeSbTe, and the above-described second protection layer 3d made of ZnS—SiO$_2$, to thereby form the formed film layer 3. Further, as the occasion demands, the above-described backing layer 4a is formed, for example, by sputtering.

Next, the light transmission flattenable film 4 consisting of inorganic material of, for example, SiO$_2$ is formed, for example, by the spin-coating technique. For example, material such as ACCUGLASS T-L 1 series (the product manufactured by Alliedood Signal Company under this trade name) is coated in a state of solution. Thereafter, the resulting coating is heated to make the quality of the film stable and thereby an SOG film is formed.

Then, surface polishing is performed of this light transmission flattenable film 4 to thereby enhance the flatness of the surface. Because the light transmission flattenable film 4 is made of inorganic material, unlike the case where the film 4 is made of organic material such as ultraviolet-ray hardenable resin, polishing by the FTP technique becomes possible. Namely, in the step of performing spin coating of the light transmission flattenable film 4, there is a case where air bubbles or particles or the like are entrapped into the film, thereby generating the above-described protrusions 6. However, these protrusions can be effectively eliminated using that FTP technique.

In this way, the phase change optical recording medium M according to the invention, for example a phase change type optical disk is formed.

[Second Embodiment]

Figure 9:
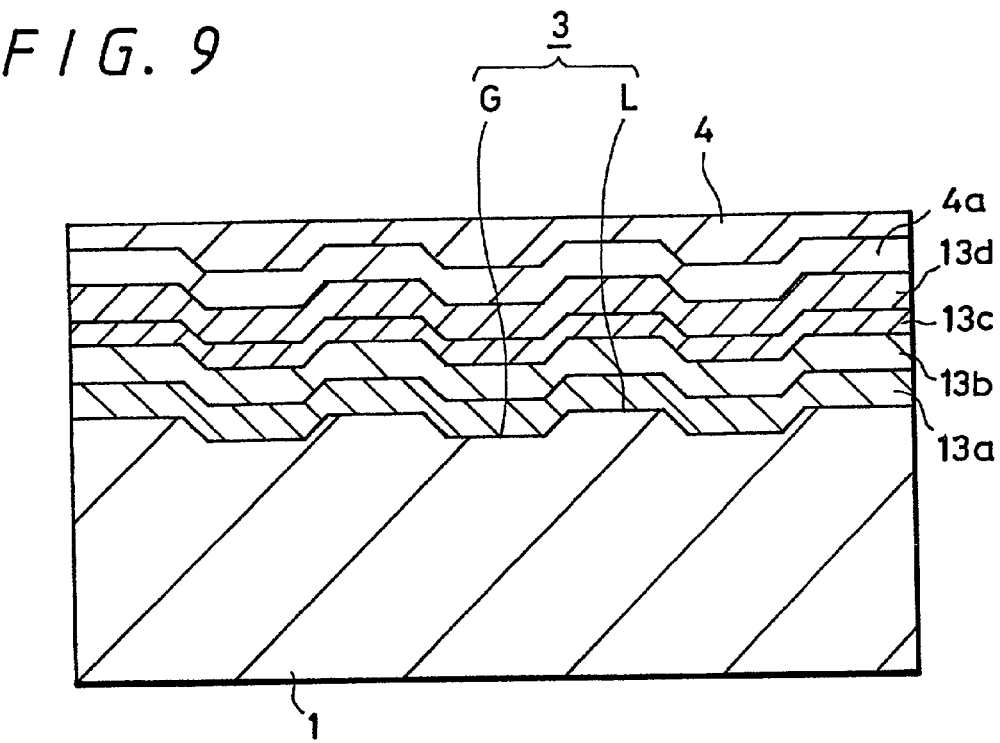
FIG. 9 is a schematic sectional view of the optical recording medium according to the embodiment of the present invention.

The optical recording medium M of this embodiment is a magneto-optic disk of land/groove recording type wherein recording and reproduction are performed using an approximately-650 nm-wavelength semiconductor laser light. It has a structure illustrated in FIG. 9.

In this example, the formed film layer 13 is formed on the substrate 1. This substrate 1 and the reflection film 13a of the formed film layer 13 can be formed with the same construction and method as in the case of the substrate 1 and reflection film 13a of the first embodiment.

The formed film layer 13 includes the following films. On the reflection film 13a, for example, there are formed by sputtering technique the first dielectric film 13b which consists of an SiN layer having a thickness of, for example, 20 nm, the first magnetic film 13c which consists of a GdFeCo layer having a thickness of 4 nm, and the second magnetic film 13d which consists of a TbFeCo layer having a thickness of 20 nm.

On the formed film layer 13 there is formed the backing layer 4a by the use of the SiN layer having a thickness of 100 nm.

The second magnetic layer 13d is formed using the above-described material whose state of magnetization is changed due to the irradiation of laser light, for example, the amorphous alloy of TbFeCo. Specifically, there is used Tb (Fe$_{90}$C$_{10}$) or Tb (Fe$_{85}$Co$_{15}$) or the like. In this material, the lower the composition ratio of Co, the lower the Curie temperature, which enables performing recording with low recording light intensity.

On the formed film layer 13 there is formed the light transmission flattenable film 4 via the backing layer 4a.

The backing layer 4a and the light transmission flattenable film 4 can be constructed in the same way as in the case of the first embodiment.

Also, as the manufacturing method of the optical recording medium M of this embodiment it is possible to adopt the same method as in the first embodiment.

In addition, in this case as well, the increase in the recording density based on the land/groove recording is achieved. Also, in case the optical recording medium M is used in the near-field system, it is possible to prevent the optical disk from impairing the optical system of the optical disk apparatus.

Next, an explanation will be given of a polishing device for performing polishing with respect to the above-described light transmission flattenable film 4 or the backing layer provided thereunder.

[Polishing Device]

Figure 10:
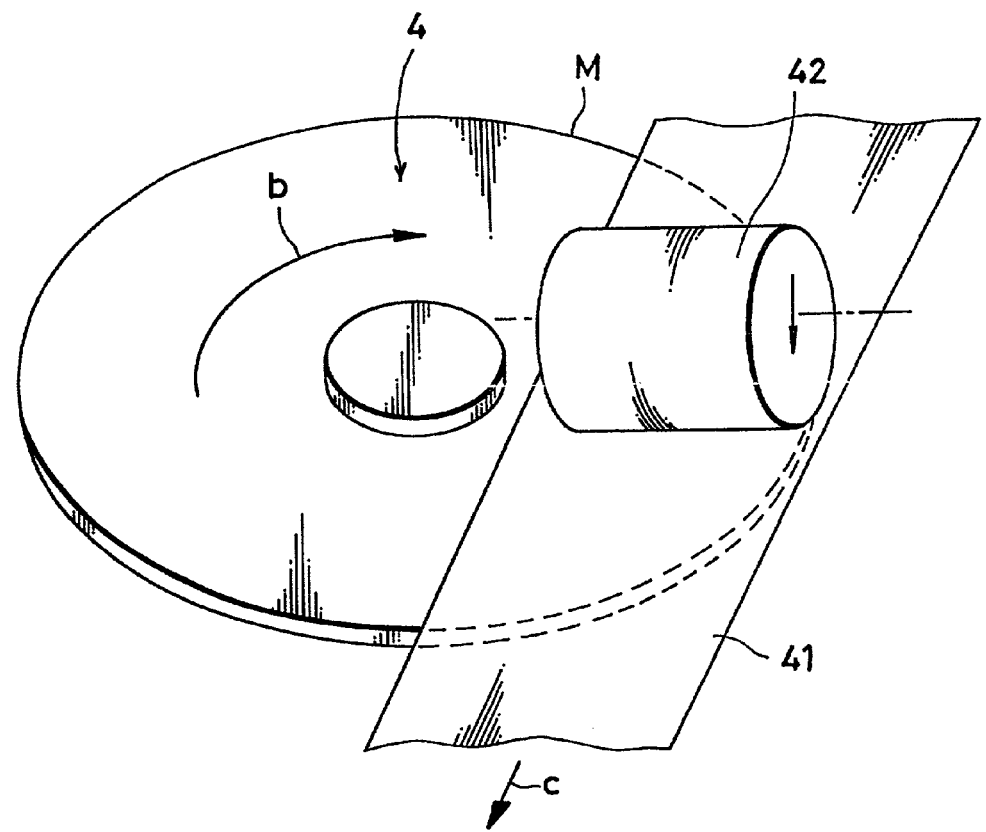
FIG. 10 is a perspective view of an example of a polishing apparatus according to the present invention.

FIG. 10 is a schematic perspective view of a state of polishing of the polishing device performed with respect to the light transmission flattenable film of the optical recording medium M of the optical disk.

The optical recording medium M is rotated in the direction of the arrow b. Then, a polishing tape 41 is applied to and placed on the light transmission flattenable film 4 of the recording medium M. Then the polishing tape 41 is moved along the surface of the medium M and in a direction tangential to it that is along the rotation direction of it (the direction of the arrow c). At this time, the rotation speed of the optical recording medium M is so selectively determined that the linear velocity of respective portions thereof may be sufficiently higher than the movement speed of the polishing tape 41.

On the other hand, pressurizing means, in this example a pressurizing roll 42 that as the working tape 41 is moved is rotated by its contact with this working tape 41, is disposed from the tape 41 so that the axial direction of the roll 42 may become the width direction of the tape 41 and be along the radial direction of the optical recording medium M. This pressurizing roll 42 is pressed with a required value of pressure toward the optical disk. At this time, although an air lubrication surface exists between the tape 41 and the surface of the medium M, the roll 42 is pressed thereagainst, whereby the tape 41 is substantially linearly pressurized onto the optical transmission flattenable film 4 of the medium M along an axial direction of the peripheral surface of the roll. As a result of this, in case the protrusions 6 exist on the light transmission flattenable film 4, the polish working tape 4 is brought to contact with these protrusions 6 and thereby polishes them.

This working tape 41 is a tape-shaped polishing sheet of #5000 to #15000 which consists mainly of, for example, alumina $Al_2O_3$ or green carbite.

By this polishing, the protrusions of the light transmission flattenable film 4 occurring due to the entrapping of the air and the so-called particles such as dust, etc. are effectively polished, whereby the level of flatness and planeness of the surface are enhanced.

FIG. 11 illustrates another example of the polishing device. In this another example, pressure-contact means is constructed of a nozzle, for example an air nozzle 43, which performs blowing-off of gas. In this case, air is blown off from the air nozzle 43 to the surface of the optical disk, i.e. optical recording medium M in a direction substantially perpendicular with respect thereto, whereby the working tape 41 can be pressure contacted with the optical recording medium surface at a pressure-applying portion 44 of a small area. And, in this case, the air nozzle 43 is so operated as to be moved for scanning in the radial direction of the optical disk.

According to the above-described polishing device, the polish working tape 41 is subjected to local pressure contact with the surface, whereby polishing is performed. Therefore, polishing of the protrusions can be effectively performed.

However, when as stated previously executing, before forming the light transmission flattenable film 4, the polishing step of abating or truncating, for example thorn-shaped projections 5 which have occurred at the time of forming the formed film layers 3 and 13, the level of the flatness of the surface of the film 4 can more reliably be enhanced as stated previously.

Figure 7:
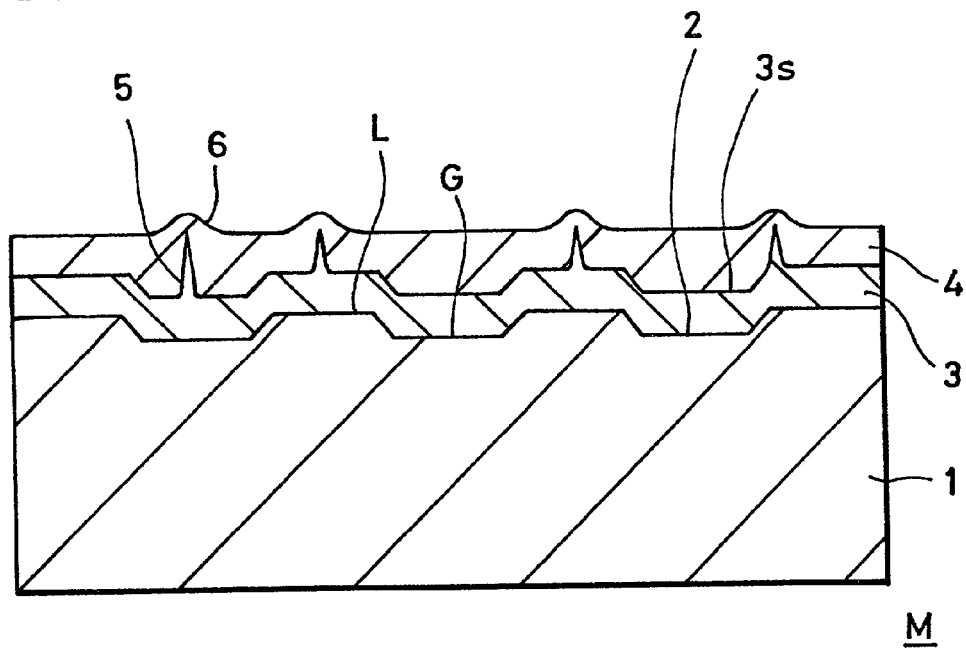
FIG. 7 is an explanatory view of a manufacturing method of the optical recording medium according to the present invention.

Namely, as was explained in connection with FIGS. 6 and 7, when forming the formed film layers 3, 13 such as a recording layer by sputtering for example, there is a case, as stated previously, where the thorn-like projections 5 occur due to an abnormal discharge of electricity, etc. In general, the height of the projection 5 is approximately the thickness of the formed film. On the other hand, the thickness of each of the respective constituent films of the formed layer 3 is approximately several nm to several hundreds of nm or so of the thickness of the formed film layer 3 as stated previously. Therefore, assuming that the thickness of the light transmission flattenable film is approximately 100 nm, those projections 5 cannot sufficiently be covered by the light transmission flattenable film 4. For this reason, when performing polishing of the light transmission flattenable film 4 by the use of the above-described polishing method, the polish working tape 1 inconveniently follows up with the projections. Accordingly, polishing cannot be performed so as to perform sufficient truncate processing with respect to the projections, whereby the protrusions 6 such as those typically illustrated in FIG. 7 are formed. Accordingly, in this case, in actuality, the grand height has the difficulty of being made equal to or smaller than 50 nm.

In contrast to this, when as stated previously eliminating or truncating the projections 5 before forming the light transmission flattenable film 4, the grand height could be made 30 nm or less.

Additionally, the above-described examples of the optical recording medium and the manufacturing method of the same according to the invention are only illustrative and not limitative. For example, instead of the polishing that is performed by the FTP technique with respect to the surface of the light transmission flattenable film 4, polishing may be performed using a griding head which is used for manufacturing the magnetic recording apparatus for use for a hard disk, etc.

The invention permits various other changes and modifications to be made without departing from the spirit and scope of the invention.

As has been described above, according to the optical recording medium of the invention and the optical recording medium obtained using the manufacturing method of the invention, the surface thereof is flattened and, even in case the medium is used in the near-field system, is effectively prevented from causing damage to the optical system.

Further, according to the invention, because it is possible to construct the optical recording medium the lands and groove of which can both be recorded, the increase in the recording density can be achieved.

Further, in the invention, the light transmission flattenable film has been made one the formation temperature of which is 150° C. or less. Therefore, the substrate constituting the optical recording medium can be made a resin substrate, i.e. can be cheaply injection molded and thereby mass producible. Resultantly, the reduction in the cost of the optical recording medium can be achieved.

Further, because of performing elimination or truncate processing of the projections before forming the light transmission flattenable film, it is eventually possible to construct the excellent optical recording medium the thickness of which is sufficiently small and the surface of which has excellent flatness. It is thereby possible to make the use of the optical recording medium one in a nearer-field, to increase the N. A., and increase the recording density.

According to the manufacturing method of the optical recording medium according to the invention, the surface thereof is flattened and has its flat plane higher in degree. In addition, when manufacturing the optical recording medium, the yield of it can be increased.

Further, as a result of the increase in the degree of the flat plane of the optical recording medium, it is possible to prolong the life of the head portion, i.e. pick-up device for performing recording or reproduction with respect to the optical recording medium and also to make the operation thereof stable. And various other advantages are brought about by the present invention.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical recording medium for performing at least one of recording and reproduction of information by irradiation of light, comprising;
    on a substrate with fine concavities and convexities formed on a surface thereof, on a side onto which said irradiation of light is performed, a formed film layer the surface of which is made a surface of fine concavities and convexities representing said fine concavities and convexities and which has at least a recording layer; and
    a light transmission flattenable film which buries therein the fine concavities and convexities surface, and which has a transmission characteristic with respect to the irradiated light, and which has its surface polished and has a hardness enabling it to be polished,
    wherein said light transmission flattenable film consists of inorganic flattenable material having a thickness that is 400 nm or less.

2. The optical recording medium according to claim 1, wherein the substrate consists of organic material substrate made of polyether sulfone (PES) or polyether imide (PEI).

3. The optical recording medium according to claim 1, wherein the thickness of the light transmission flattenable film is 100 nm or less.

4. The optical recording medium according to claim 1, wherein the light transmission flattenable film consists of spin-coat flattenable material having $SiO_2$ as a main component.

5. The optical recording medium according to claim 1, wherein the light transmission flattenable film has a level of flatness by having protrusions eliminated that damage an optical system disposed in the proximity of and in opposition to the surface of the light recording medium and performs the irradiation of light.

6. The optical recording medium according to claim 1, wherein the fine concavities and convexities have lands and grooves;
    the difference in level between the land and the groove is selected to be at a value which only causes mutual interaction between these two to less occur with respect to the irradiated light; and
    the recording of the information is performed with respect to the recording layer of either, or both, of the land and the groove.

7. The optical recording medium according to claim 1, wherein the recording layer has a material layer the phase of which is changed by the irradiation of light from an amorphous state of low reflectance to a crystalline state of high reflectance or vice versa.

8. An optical recording medium according to claim 1, wherein the recording layer has a material layer the state of magnetization of which is changed by the irradiation of light.

9. The optical recording medium according to claim 1, wherein said light transmission flattenable film is capable of being polished.

10. The optical recording medium according to claim 1, wherein said formed film layer includes a reflection film, a first dielectric film and a phase change recording layer.

11. The optical recording medium according to claim 10, wherein said reflection film is formed on said substrate, said first dielectric film is formed on said reflection film, and said phase change recording layer is formed on said first dielectric film.

12. The optical recording medium according to claim 1, wherein said light transmission flattenable film includes a backing layer, a light transmission flattenable layer and a surface layer, said backing layer being above said formed film layer, said light transmission flattenable layer being above said backing layer, said surface layer being above said light transmission flattenable layer.

13. The optical recording medium according to claim 12, wherein a backing layer of dielectric material is formed on a surface where the light transmission flattenable film is formed.

14. The optical recording medium according to claim 12, wherein said backing layer is a first dielectric, said light transmission flattenable layer is a second dielectric, and said surface layer is a third dielectric.

15. The optical recording medium according to claim 14, wherein said first dielectric, said second dielectric and said third dielectric are the same dielectric.

16. The optical recording medium according to claim 12, wherein said light transmission flattenable film is on said formed film layer.

17. The optical recording medium according to claim 16, wherein said backing layer is on said formed film layer, said light transmission flattenable layer is formed on said backing layer, and said surface layer is on said light transmission flattenable layer.

* * * * *